(12) United States Patent
Yabe

(10) Patent No.: US 9,109,919 B2
(45) Date of Patent: Aug. 18, 2015

(54) CURVED-SECTION-INFORMATION SUPPLYING APPARATUS AND CURVED-SECTION-INFORMATION SUPPLYING METHOD

(71) Applicant: ALPINE ELECTRONICS, INC., Shinagawa-ku, Tokyo (JP)

(72) Inventor: Tetsuro Yabe, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 14/314,504

(22) Filed: Jun. 25, 2014

(65) Prior Publication Data

US 2015/0057922 A1 Feb. 26, 2015

(30) Foreign Application Priority Data

Aug. 26, 2013 (JP) ................................. 2013-174549

(51) Int. Cl.
| | | |
|---|---|---|
| G01S 13/88 | (2006.01) | |
| G01C 21/30 | (2006.01) | |
| G01C 21/32 | (2006.01) | |
| G01C 21/36 | (2006.01) | |

(Continued)

(52) U.S. Cl.
CPC ............ *G01C 21/3658* (2013.01); *G01C 21/30* (2013.01); *G01C 23/00* (2013.01); *G09B 29/106* (2013.01)

(58) Field of Classification Search
USPC ................. 701/300, 514, 437, 523, 448, 410; 702/155, 167, 157
See application file for complete search history.

(56) References Cited

U.S. PATENT DOCUMENTS

| | | | | |
|---|---|---|---|---|
| 6,751,547 | B2 * | 6/2004 | Khosla ........................ | 701/514 |
| 7,522,091 | B2 * | 4/2009 | Cong et al. .................. | 342/70 |
| 7,626,533 | B2 * | 12/2009 | Cong et al. .................. | 342/70 |

(Continued)

FOREIGN PATENT DOCUMENTS

| | | | |
|---|---|---|---|
| JP | 2005-196657 | * | 2/2005 |
| JP | 2005-043194 | * | 7/2005 |

(Continued)

OTHER PUBLICATIONS

A novel curve lane detection based on Improved River Flow and RANSA; Huachun Tan; Yang Zhou; Yong Zhu; Danya Yao; Keqiang Li; Intelligent Transportation Systems (ITSC), 2014 IEEE 17th International Conference on; Year: 2014; pp. 133-138, DOI: 10.1109/ITSC.2014.6957679.*

(Continued)

*Primary Examiner* — Cuong H Nguyen
(74) *Attorney, Agent, or Firm* — Brinks Gilson & Lione

(57) ABSTRACT

A curved-section-information supplying apparatus includes: a clothoid-section identifying unit that identifies a clothoid section included in a curved section of a road; a clothoid-coefficient obtaining unit that obtains a clothoid coefficient for a clothoid curve representing a shape of the clothoid section identified by the clothoid-section identifying unit; and a radius-of-curvature calculating unit that calculates a radius of curvature at a position at a travel distance in the clothoid section, based on the clothoid coefficient and a curve length from a start point of the clothoid curve, the curve length corresponding to the travel distance from a start point of the clothoid section, to supply curved-section information based on the radius of curvature at the position at the travel distance in the clothoid section.

20 Claims, 11 Drawing Sheets

(51) Int. Cl.
*G09B 29/10* (2006.01)
*G01C 23/00* (2006.01)

(56) References Cited

U.S. PATENT DOCUMENTS

| | | | |
|---|---|---|---|
| 7,734,404 B2* | 6/2010 | Shiiba et al. | 701/70 |
| 8,583,355 B2* | 11/2013 | Fukumoto et al. | 701/467 |
| 2003/0100992 A1* | 5/2003 | Khosla | 701/200 |
| 2005/0187705 A1 | 8/2005 | Niwa et al. | |
| 2005/0225477 A1* | 10/2005 | Cong et al. | 342/70 |
| 2006/0190158 A1* | 8/2006 | Shiiba et al. | 701/70 |
| 2008/0183419 A1* | 7/2008 | Cong et al. | 702/155 |
| 2009/0248290 A1* | 10/2009 | Fukumoto et al. | 701/200 |
| 2009/0248299 A1* | 10/2009 | Fukumoto et al. | 701/208 |
| 2009/0248768 A1* | 10/2009 | Fukumoto et al. | 708/207 |
| 2010/0198474 A1* | 8/2010 | Shiiba et al. | 701/70 |

FOREIGN PATENT DOCUMENTS

| | | |
|---|---|---|
| JP | 2005-214839 | 8/2005 |
| JP | 2006-031553 | 2/2006 |
| JP | 2006-219032 | 8/2006 |
| JP | 2009-032031 | 2/2009 |
| JP | 2015042951 A * | 3/2015 |

OTHER PUBLICATIONS

Improving driver's visual field using estimation of curvature; Ki-Hyeon Kim; Dong-Hoon Yum; Dong-Kyu Byeon; Doo-Young Kim; Dong-ik Lee; Control Automation and Systems (ICCAS), 2010 International Conference on; Year: 2010; pp. 728-731.*

A lane tracking system for intelligent vehicle applications; Redmill, K.A.; Upadhya, S.; Krishnamurthy, A.; Ozguner, U.; Intelligent Transportation Systems, 2001. Proceedings. 2001 IEEE; Year: 2001; pp. 273-279, DOI: 10.1109/ITSC.2001.948668.*

Collision-free and continuous-curvature path planning for car-like robots; Scheuer, A.; Fraichard, T. ; Robotics and Automation, 1997. Proceedings., 1997 IEEE International Conference on; Year: 1997, vol. 1; pp. 867-873 vol. 1, DOI: 10.1109/ROBOT.1997.620143.*

* cited by examiner

FIG. 8

| Ic | GRADIENT ANGLE τ |
|---|---|
| 0.01 | 0.00005 |
| 0.02 | 0.00020 |
| 0.03 | 0.00045 |
| 0.04 | 0.00080 |
| 0.05 | 0.00125 |
| 0.06 | 0.00180 |
| 0.07 | 0.00245 |
| 0.08 | 0.00320 |
| 0.09 | 0.00405 |
| 0.10 | 0.00500 |
| 0.11 | 0.00605 |
| 0.12 | 0.00720 |
| 0.13 | 0.00845 |
| 0.14 | 0.00980 |
| 0.15 | 0.01125 |
| 0.16 | 0.01280 |
| 0.17 | 0.01445 |
| ⋮ | ⋮ |

CURVED-SECTION-INFORMATION SUPPLYING APPARATUS AND CURVED-SECTION-INFORMATION SUPPLYING METHOD

RELATED APPLICATION

The present application claims priority to Japanese Patent Application Number 2013-174549, filed Aug. 26, 2013, the entirety of which is hereby incorporated by reference.

BACKGROUND

1. Field of the Invention

The present invention relates to a curved-section-information supplying apparatus and a curved-section-information supplying method that supply curved-section information representing the shape of a clothoid section included in a curved section of a road.

2. Description of the Related Art

As an example, on an expressway R like that illustrated in FIG. 1, there is a road section that continues from a straight section $Ss_{IN}$ to a curved section Sc and further continues from the curved section Sc to a straight section $Ss_{OUT}$. The curved section Sc in such a road section is, in many cases, designed so as to have a shape obtained by connecting a clothoid section $Scl_{IN}$ having a shape that follows a clothoid curve, an arc section So having a shape that follows an arc curve, and another clothoid section $Scl_{OUT}$, as schematically illustrated in FIGS. 1 and 2. As illustrated in FIG. 3, a relationship between a curve length L from a start point Pst of a clothoid curve CVcl and a radius of curvature, R, at the position of the curve length L is represented by:

$$L \cdot R = A^2.$$

In this equation, because the curve length L and the radius of curvature, R, at the position of the curve length L are in inverse proportion to each other, the clothoid curve CVcl has a shape in which the radius of curvature, R, decreases as the curve length L increases.

When a vehicle is made to travel in such a road section at the same speed, an operation is performed in such a manner that the steering wheel held at a neutral position in the straight section $Ss_{IN}$ is turned at the same angular velocity in a clothoid section $Sc_{IN}$, the steering wheel is held at a certain steering angle in the arc section So, and in a clothoid section $Sc_{OUT}$, the steering wheel held at the certain steering angle is turned back to the neutral position by the time the vehicle reaches the straight section $Ss_{OUT}$. By designing a curved section Sc so as to connect the clothoid section Scl, the arc section So, and the clothoid section $Sc_{OUT}$, the vehicle can pass through the curved section Sc smoothly without a sudden steering operation.

There is a road-shape estimating apparatus (corresponding to a curved-section-information supplying apparatus) for estimating the shape of a curved section of a road, as disclosed in Japanese Unexamined Patent Application Publication No. 2005-214839. The road-shape estimating apparatus uses a table indicating relationships between the smallest radius of a curved section (which is assumed to be the radius of an arc section that follows a clothoid section) and clothoid coefficients, to obtain a clothoid coefficient corresponding to the smallest radius of an actual curved section. In accordance with an approximate equation using the clothoid coefficient, the road-shape estimating apparatus determines a clothoid curve (a sequence of a large number of points, for example, 100 points, represented by X and Y coordinates) for the actual curved section. The determined clothoid curve is made to match (fit to) the sequence of node points representing the curved section, and information of the clothoid curve that matches the sequence of the node points is provided as information indicating the shape of the curved section.

In order to determine a clothoid curve, the above-described known apparatus (corresponding to the curved-section-information supplying apparatus) generally needs to calculate coordinate values of a large number of points (e.g., 100 points) representing the clothoid curve, and this calculation processing requires a relatively large amount of time. Also, when providing information of a radius of curvature (or a curvature) at each traveling position in a curved section, the information being useful for speed control, anti-skid control, and so on for a vehicle, the above-described known apparatus further needs to calculate a radius of curvature at each traveling position on the basis of the obtained clothoid curve information.

As described above, the known apparatus requires a relatively large amount of time for calculating a clothoid curve and further involves a calculation for obtaining curved-section information required for various types of control of a vehicle and based on the radius of curvature at each traveling position in a clothoid section. Thus, the known apparatus is not suitable for an application in which it is mounted in a vehicle to supply curved-section information based on the radius of curvature at each traveling position in a clothoid section included in a curved section actually traveled.

SUMMARY

The present invention has been made in view of such a situation, and is aimed to provide a curved-section-information supplying apparatus and a curved-section-information supplying method that can easily supply curved-section information based on the radius of curvature at each traveling position in a clothoid section included in a curved section of a road.

A curved-section-information supplying apparatus according to an embodiment of the present invention supplies curved-section information regarding a clothoid section included in a curved section of a road. The curved-section-information supplying apparatus includes: clothoid-section identifying means for identifying a clothoid section included in a curved section of a road; clothoid-coefficient obtaining means for obtaining a clothoid coefficient for a clothoid curve representing a shape of the clothoid section identified by the clothoid-section identifying means; and radius-of-curvature calculating means for calculating a radius of curvature at a position at a travel distance in the clothoid section, based on the clothoid coefficient and a curve length from a start point of the clothoid curve, the curve length corresponding to the travel distance from a start point of the clothoid section, to supply curved-section information based on the radius of curvature at the position at the travel distance in the clothoid section.

With this configuration, the clothoid section included in the curved section of the road is identified, and the clothoid coefficient for the clothoid curve representing the shape of the clothoid section is obtained. Then, the radius of curvature at the position at the travel distance in the clothoid section is calculated based on the clothoid coefficient and the curve length from the start point of the clothoid curve, the curve length corresponding to the travel distance from the start point of the clothoid section. Then, curved-section information based on the radius of curvature at the position at the travel distance in the clothoid section is supplied.

The curved-section information is not particularly limited, as long as it is information based on the radius of curvature, and may be the value of the radius of curvature, the value of curvature, or any other information derived from the radius of curvature.

In the curved-section-information supplying apparatus according to embodiments of the present invention, the clothoid-section identifying means may include straight-section identifying means for identifying a straight section that connects to the curved section; and arc-section identifying means for identifying an arc section in the curved section, to identify a section between the straight section and the arc section as the clothoid section.

With this configuration, it is possible to identify the clothoid section by identifying the straight section that connects to the curved section and the arc section in the curved section, without directly identifying the clothoid section in the curved section.

The curved-section-information supplying apparatus according to embodiments of the present invention may further include: a storage unit that stores therein a table indicating a relationship between a value of a gradient parameter $\tau$ indicating a gradient of a tangent line to an arc curve representing a shape of an arc section at a boundary point between a clothoid section and the arc section in a curved section of a road and a value of a parameter lc defined as $$lc=Lc/A$$

by using a curve length Lc from the start point of the clothoid curve to the boundary point and the clothoid coefficient A; and arc-section identifying means for identifying an arc section that is included in the curved section and connects to the clothoid section. The clothoid-coefficient obtaining means may include: gradient obtaining means for obtaining the value of the gradient parameter $\tau$ for the tangent line to the arc curve representing the shape of the arc section at the boundary point between clothoid section identified by the clothoid-section identifying means and the arc section identified by the arc-section identifying means; parameter-value obtaining means for obtaining the value of the parameter lc corresponding to the value of the gradient parameter $\tau$ obtained by the gradient obtaining means, by referring to the table stored in the storage unit; curve-length calculating means for calculating a value of the curve length Lc from the start point of the clothoid curve to the boundary point; and clothoid-coefficient calculating means for calculating a value of the clothoid coefficient A, based on the value of the parameter lc and the value of the curve length Lc.

Also, in the curved-section-information supplying apparatus according to embodiments of the present invention, when the clothoid-section identifying means includes the straight-section identifying means for identifying a straight section that connects to the curved section and the arc-section identifying means for identifying the arc section in the curved section to identify the arc section, the curved-section-information supplying apparatus may further include a storage unit that stores therein a table indicating a relationship between a value of a gradient parameter $\tau$ indicating a gradient of a tangent line to an arc curve representing a shape of an arc section at a boundary point between a clothoid section and the arc section in a curved section of a road and a value of a parameter lc defined as $$lc=Lc/A$$

by using a curve length Lc from the start point of the clothoid curve to the boundary point and the clothoid coefficient A. The clothoid-coefficient obtaining means may include: gradient obtaining means for obtaining the value of the gradient parameter $\tau$ for the tangent line to the arc curve representing the shape of the arc section at the boundary point between clothoid section identified by the clothoid-section identifying means and the arc section identified by the arc-section identifying means; parameter-value obtaining means for obtaining the value of the parameter lc corresponding to the value of the gradient parameter $\tau$ obtained by the gradient obtaining means, by referring to the table stored in the storage unit; curve-length calculating means for calculating a value of the curve length Lc from the start point of the clothoid curve to the boundary point; and clothoid-coefficient calculating means for calculating a value of the clothoid coefficient A, based on the value of the parameter lc and the value of the curve length Lc.

With this configuration, the clothoid section and the arc section included in the curved section of the road is identified, and the clothoid coefficient of the clothoid curve representing the shape of the clothoid section is identified. Then, the value of the parameter $\tau$ indicating the gradient of the tangent line to the arc curve representing the shape of the arc section at the boundary point between the identified clothoid section and the identified arc section is obtained. A table indicating a relationship between a value of a gradient parameter $\tau$ indicating a gradient of a tangent line to an arc curve representing a shape of an arc section at a boundary point between a clothoid section and the arc section in a curved section of a road and a value of a parameter lc defined as $$lc=Lc/A$$

by using a curve length Lc from the start point of the clothoid curve to the boundary point and the clothoid coefficient A is used to obtain the value of the parameter lc corresponding to the value of the obtained gradient parameter $\tau$ addition, the value of the curve length Lc from the start point of clothoid curve to the boundary point is calculated, and the clothoid coefficient is calculated based on the value of the parameter lc and the value of the curve length Lc. Thereafter, the radius of curvature at the position at the travel distance in the clothoid section is calculated based on the clothoid coefficient and the curve length from the start point of the clothoid curve which corresponds to the travel distance.

In the curved-section-information supplying apparatus according to the present invention, the radius-of-curvature calculating means may calculate a radius of curvature, R, at the position at the travel distance in the clothoid section, the travel distance corresponding to a curve length L from the start point of the clothoid curve, in accordance with:

$$R=A^2/L$$

by using the value of the clothoid coefficient A obtained by the clothoid-coefficient obtaining means.

In the curved-section-information supplying apparatus according to embodiments of the present invention, the curved-section-information supplying apparatus may further include: a storage unit that stores therein a table indicating a relationship between a value of a gradient parameter $\tau$ indicating a gradient of a tangent line to an arc curve representing a shape of an arc section at a boundary point between a clothoid section and the arc section in a curved section of a road and a value of a parameter lc defined as $$lc=Lc/A$$

by using a curve length Lc from the start point of the clothoid curve to the boundary point and the clothoid coefficient A. The clothoid-coefficient obtaining means may include: gradient obtaining means for obtaining the value of the gradient parameter τ for the tangent line to the arc curve representing the shape of the arc section at the boundary point between clothoid section identified by the clothoid-section identifying means and the arc section identified by the arc-section identifying means; parameter-value obtaining means for obtaining the value of the parameter lc corresponding to the value of the gradient parameter τ obtained by the gradient obtaining means, by referring to the table stored in the storage unit; arc-radius obtaining means for obtaining a value of a radius Rc of an arc curve representing the shape of the arc section identified by the arc-section identifying means; and clothoid-coefficient calculating means for calculating the clothoid coefficient A, based on the value of the parameter lc obtained by the parameter-value obtaining means and the value of the radius Rc of the arc curve.

Also, in the curved-section-information supplying apparatus, when the clothoid-section identifying means includes straight-section identifying means for identifying a straight section that connects to the curved section and arc-section identifying means for identifying the arc section in the curved section to identify the arc section, the curved-section-information supplying apparatus may further include: a storage unit that stores therein a table indicating a relationship between a value of a gradient parameter τ indicating a gradient of a tangent line to an arc curve representing a shape of an arc section at a boundary point between a clothoid section and the arc section in a curved section of a road and a value of a parameter lc defined as $$lc=Lc/A$$

by using a curve length Lc from the start point of the clothoid curve to the boundary point and the clothoid coefficient A. The clothoid-coefficient obtaining means may include: gradient obtaining means for obtaining the value of the gradient parameter τ for the tangent line to the arc curve representing the shape of the arc section at the boundary point between clothoid section identified by the clothoid-section identifying means and the arc section identified by the arc-section identifying means; parameter-value obtaining means for obtaining the value of the parameter lc corresponding to the value of the gradient parameter τ obtained by the gradient obtaining means, by referring to the table stored in the storage unit; arc-radius obtaining means for obtaining a value of a radius Rc of an arc curve representing the shape of the arc section identified by the arc-section identifying means; and clothoid-coefficient calculating means for calculating the clothoid coefficient A, based on the value of the parameter lc obtained by the parameter-value obtaining means and the value of the radius Rc of the arc curve.

With this configuration, the clothoid section and the arc section included in the curved section of the road is identified, and the clothoid coefficient of the clothoid curve representing the shape of the clothoid section is identified. Then, the value of the parameter τ indicating the gradient of the tangent line to the arc curve representing the shape of the arc section at the boundary point between the identified clothoid section and the identified arc section is obtained. A table indicating a relationship between a value of a gradient parameter τ indicating a gradient of a tangent line to an arc curve representing a shape of an arc section at a boundary point between a clothoid section and the arc section in a curved section of a road and a value of a parameter lc defined as $$lc=Lc/A$$

by using a curve length Lc from the start point of the clothoid curve to the boundary point and the clothoid coefficient A is used to obtain the value of the parameter lc corresponding to the value of the obtained gradient parameter τ. In addition, the value of the radius Rc of the arc curve representing the shape of the identified arc section is obtained, and the clothoid coefficient is calculated based on the value of the parameter lc and the value of the radius Rc of the arc curve is calculated. Thereafter, the radius of curvature at the position at the travel distance in the clothoid section is calculated based on the clothoid coefficient and the curve length from the start point of the clothoid curve which corresponds to the travel distance.

In these cases, the radius of curvature can be calculated using the radius Rc of the arc curve, instead of the curve length Lc from the start point of the clothoid curve to the boundary point.

In the curved-section-information supplying apparatus, the clothoid-coefficient calculating means may calculate the clothoid coefficient A in accordance with:

$$A=Rc \cdot lc, \text{ which is derived from}$$

$$Rc \cdot Lc = A^2, \text{ and}$$

$$lc=Lc/A.$$

Also, the radius-of-curvature calculating means may calculate a radius of curvature, R, in accordance with $$R=A^2/L$$

using a curve length L from the start point of the clothoid curve, the curve length L corresponding to a travel distance from the start point of the clothoid section.

Another curved-section-information supplying apparatus according to an embodiment of the present invention is directed to a curved-section-information supplying apparatus that supplies curved-section information regarding a clothoid section included in a curved section of a road. The curved-section-information supplying apparatus includes: clothoid-section identifying means for identifying a clothoid section included in a curved section of a road; arc-section identifying means for identifying an arc section that follows the clothoid section; a storage unit that stores therein a table indicating a relationship between a value of a gradient parameter τ indicating a gradient of a tangent line to an arc curve representing a shape of an arc section at a boundary point between a clothoid section and the arc section in a curved section of a road and a value of a parameter lc defined as $$lc=Lc/A$$

by using a curve length Lc from a start point of the clothoid curve to the boundary point and a clothoid coefficient A; arc-radius obtaining means for obtaining a value of a radius Rc of an arc curve representing the shape of the arc section identified by the arc-section identifying means; gradient obtaining means for obtaining the value of the gradient parameter τ for the tangent line to the arc curve representing the shape of the arc section at the boundary point between clothoid section identified by the clothoid-section identifying means and the arc section identified by the arc-section identifying means; parameter-value obtaining means for obtaining the value of the parameter lc corresponding to the value of the gradient parameter τ obtained by the gradient obtaining means, by referring to the table stored in the storage unit; and radius-of-curvature calculating means for calculating a radius of curvature at a position at a travel distance in the clothoid section, based on a curve length L from the start point of the clothoid curve, the curve length L corresponding to the travel distance from a start point of the clothoid section, the value of the parameter lc obtained by the parameter-value obtaining means, and the value of the radius Rc of the arc curve obtained by the arc-radius obtaining means, to supply curved-section information based on the radius of curvature at the position at the travel distance in the clothoid section.

With this configuration, first, the clothoid section and the arc section included in the curved section of the road are identified. Then, the value of the parameter τ indicating the gradient of the tangent line to the arc curve representing the shape of the arc section at the boundary point between the identified clothoid section and the identified arc section is obtained. A table indicating a relationship between a value of a gradient parameter τ indicating a gradient of a tangent line to an arc curve representing a shape of an arc section at a boundary point between a clothoid section and the arc section in a curved section of a road and a value of a parameter lc defined as $$lc=Lc/A$$

by using a curve length Lc from the start point of the clothoid curve to the boundary point and the clothoid coefficient A is used to obtain the value of the parameter lc corresponding to the value of the obtained gradient parameter τ addition, the value of the radius Rc of the arc curve representing the shape of the identified arc section is obtained, and the radius of curvature at the position at the travel distance from the start point of the clothoid section is calculated based on the value of the parameter lc and the value of the radius Rc of the arc curve.

In this case, the radius of curvature can be calculated using the radius Rc of the arc curve representing the shape of the arc section, instead of the clothoid coefficient A of the clothoid curve.

In the curved-section-information supplying apparatus, the clothoid-section identifying means may include straight-section identifying means for identifying a straight section that connects to the curved section, and may identify, as the clothoid section, a section between the straight section and the arc section identified by the arc-section identifying means.

In the curved-section-information supplying apparatus, the radius-of-curvature calculating means may calculate the radius of curvature, R, in accordance with $$R=(Rc \cdot lc)^2/L, \text{ which is derived from}$$

$$R \cdot L=A^2 \text{ and } lc=Lc/A,$$

where $R \cdot L=A^2$ uses the curve length L from the start point of the clothoid curve, the curve length L corresponding to a travel distance from a start point of the clothoid section, and the clothoid coefficient A of the clothoid curve.

A curved-section-information supplying method according an embodiment of to the present invention provides curved-section information regarding a clothoid section included in a curved section of a road. The curved-section-information supplying method includes: a clothoid-section identifying step of identifying a clothoid section included in a curved section of a road; a clothoid-coefficient obtaining step of obtaining a clothoid coefficient for a clothoid curve representing a shape of the clothoid section identified in the clothoid-section identifying step; and a radius-of-curvature calculating step of calculating a radius of curvature at a position at a travel distance in the clothoid section, based on the clothoid coefficient and a curve length from a start point of the clothoid curve, the curve length corresponding to the travel distance from a start point of the clothoid section, to supply curved-section information based on the radius of curvature at the position at the travel distance in the clothoid section.

A curved-section-information supplying method according to an embodiment the present invention is directed to a curved-section-information supplying apparatus that supplies curved-section information regarding a clothoid section included in a curved section of a road. The curved-section-information supplying method includes: a clothoid-section identifying step of identifying a clothoid section included in a curved section of a road; an arc-section identifying step of identifying an arc section that follows the clothoid section; an arc-radius obtaining step of obtaining a value of a radius Rc of an arc curve representing the shape of the arc section identified by the arc-section identifying step; a gradient obtaining step of obtaining a value of a gradient parameter τ indicating a gradient of a tangent line to the arc curve representing the shape of the arc section at the boundary point between clothoid section identified in the clothoid-section identifying step and the arc section identified in the arc-section identifying step; a parameter-value obtaining step of obtaining the value of the parameter lc corresponding to the value of the gradient parameter τ obtained in the gradient obtaining step, by using a table indicating a relationship between a value of a gradient parameter τ indicating a gradient of a tangent line to an arc curve representing a shape of an arc section at a boundary point between a clothoid section and the arc section in a curved section of a road and a value of a parameter lc defined as $$lc=Lc/A$$

by using a curve length Lc from a start point of the clothoid curve to the boundary point and a clothoid coefficient A; and a radius-of-curvature calculating step of calculating a radius of curvature at a position at a travel distance in the clothoid section, based on a curve length L from the start point of the clothoid curve, the curve length L corresponding to the travel distance from a start point of the clothoid section, the value of the parameter lc obtained in the parameter-value obtaining step, and the value of the radius Rc of the arc curve obtained in the arc-radius obtaining step, to supply curved-section information based on the radius of curvature at the position at the travel distance in the clothoid section.

In the curved-section-information supplying apparatus according to embodiments of the present invention, the clothoid section included in the curved section of the road is identified, and the clothoid coefficient for the clothoid curve representing the shape of the clothoid section is obtained. Then, the radius of curvature at the position at the travel distance in the clothoid section is calculated based on the clothoid coefficient and the curve length from the start point of the clothoid curve, the curve length corresponding to the travel distance from the start point of the clothoid section. Thus, it is possible to provide curved-section information based on the radius of curvature at the position at the travel distance from the start point of the clothoid section, without actually determining the clothoid curve. Accordingly, it is possible to easily supply curved-section information based on the radius of curvature at each traveling position in a clothoid section included in a curved section of a road.

BRIEF DESCRIPTION OF THE DRAWINGS

FIG. 8 illustrates one example of a table indicating relationships between the values of a parameter lc and the values of a gradient angle τ;

DETAILED DESCRIPTION OF THE PREFERRED EMBODIMENTS

An embodiment of the present invention will be described below with reference to the accompanying drawings.

Figure 4:
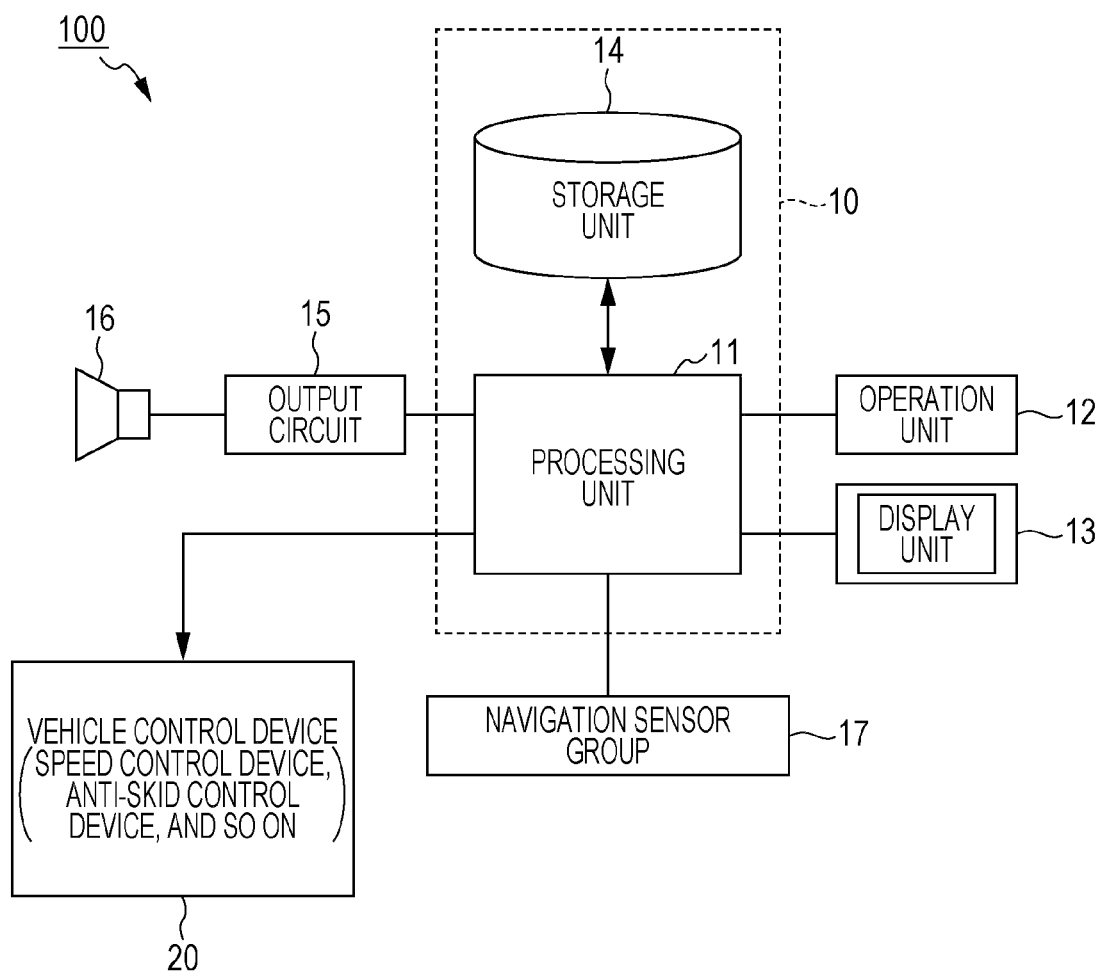
FIG. 4 is a block diagram illustrating an example configuration of a navigation apparatus including a curved-section-information supplying apparatus according to an embodiment of the present invention.

A navigation apparatus including a curved-section-information supplying apparatus according to one embodiment of the present invention is configured as illustrated in FIG. 4.

In FIG. 4, a navigation apparatus 100 includes a computer unit (including a central processing unit (CPU)) and has a processing unit 11 that executes various types of processing in accordance with a program. A navigation sensor group 17 and a storage unit 14 (e.g., a hard-disk drive) are coupled to the processing unit 11. The navigation sensor group 17 includes a global positioning system (GPS) receiver, an acceleration sensor, a wheel-speed sensor, and a gyro sensor. The storage unit 14 stores therein various types of information (including a table and so on) used for processing, such as map display, route search, and navigation processing, performed by the processing unit 11. Examples of the information stored in the storage unit 14 include information regarding facilities and map information including road-shape element point data indicating the shapes of roads and information about road links.

An operation unit 12, a display unit 13, and an output circuit 15 are coupled to the processing unit 11. The display unit 13 includes a liquid crystal display (LCD) or the like to display various types of information. The operation unit 12 includes a touch panel on the display unit 13, operation buttons, and so on and is used to input instructions for processing and various types of information. The output circuit 15 is coupled to a speaker 16. The processing unit 11 displays a map on the display unit 13 on the basis of the map information, the information regarding the facilities, and so on, which are stored in the storage unit 14, and performs processing for searching for a route to a facility specified as a destination through an operation of the operation unit 12. In addition, the processing unit 11 detects the position of the vehicle on the basis of various detection signals from the navigation sensor group 17, and performs route guidance processing for vehicle navigation and guidance in accordance with a route obtained by the search, by using information of the detected position and the map information. In the route guidance processing, the processing unit 11 causes a mark indicating the position of the vehicle to be displayed on the display unit 13 in conjunction with the map and outputs audio signals to the output circuit 15 so that a voice/sound guidance for navigation of the vehicle along the route is output from the speaker 16.

The processing unit 11 also has a function for generating curved-section information based on a radius of curvature at each traveling position in a clothoid section in a curved section of a road through use of the map information and a table (described below) stored in the storage unit 14 and supplying the generated curved-section information. The processing unit 11 and the storage unit 14 constitute a curved-section-information supplying apparatus 10. The processing unit 11 supplies the generated curved-section information (the radius of curvature) to a vehicle control device 20. By using the curved-section information based on the radius of curvature supplied by the curved-section-information supplying apparatus 10, the vehicle control device 20 performs speed control, anti-skid control, and on the vehicle so that the vehicle can travel stably in a curved section including a clothoid section.

Figure 5:
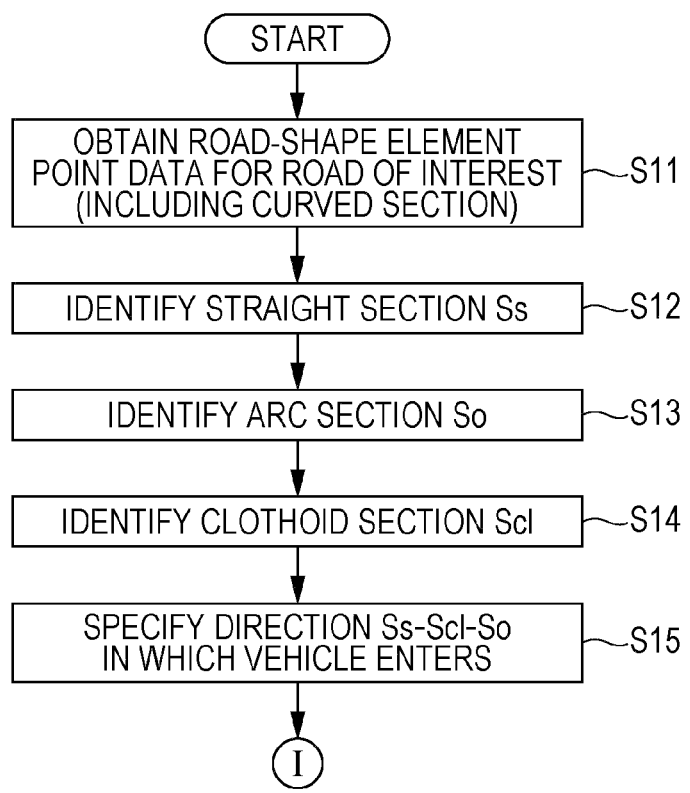
FIG. 5 is a flowchart illustrating processing for identifying a clothoid section.

The processing unit 11 that functions as the curved-section-information supplying apparatus 10 performs processing for identifying a clothoid section of a road of interest in accordance with a procedure illustrated in FIG. 5.

In step S11 in FIG. 5, the processing unit 11 obtains, from the map information stored in the storage unit 14, road-shape element point data for a road of interest including a curved section. The road-shape element point data includes coordinate values (X, Y), for example, latitude and longitude, of points (road-shape element points) of a point sequence representing the shape of a road. In step S12, on the basis of the road-shape element point data for the road of interest, the processing unit 11 identifies a straight section Ss that connects to the curved section Sc of the road of interest. For example, whether or not a section in question is a straight section Ss can be determined based on a change in the gradient of a straight line that connects adjacent road-shape element points. A section in a predetermined range in which a change in the gradient of a straight line that connects adjacent road-shape element points is assumed to be zero is identified as a straight section Ss. Specifically, the processing unit 11 identifies a sequence of road-shape element points in the straight section Ss.

Figure 7:
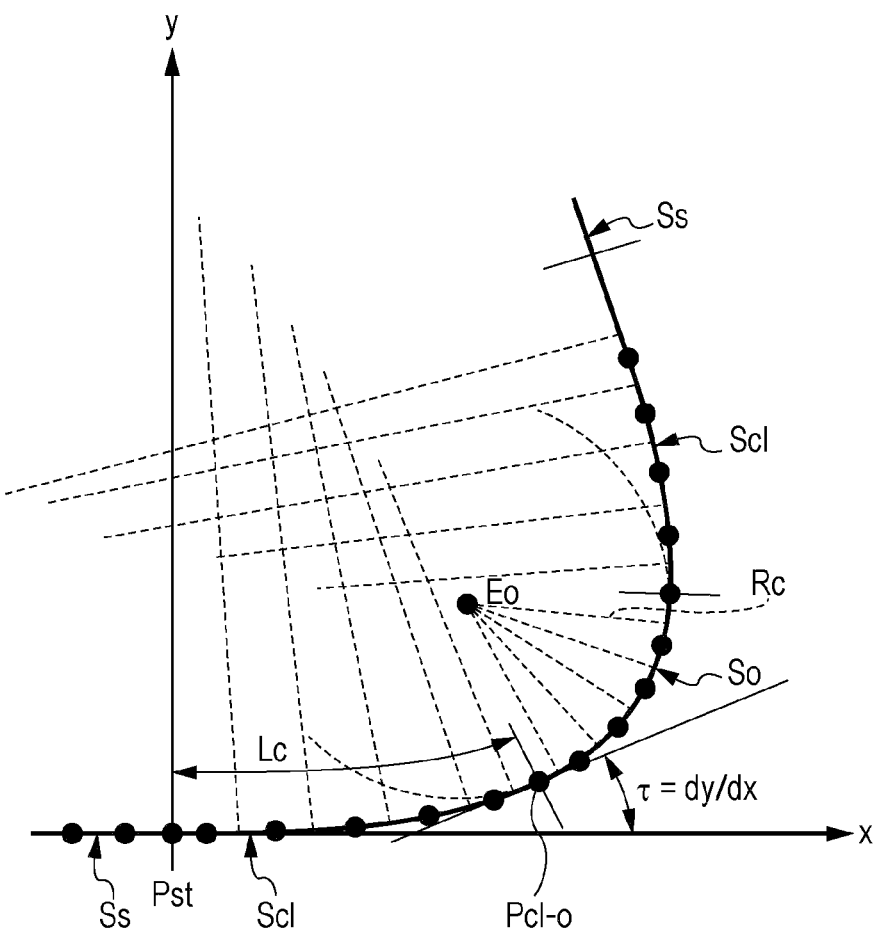
FIG. 7 illustrates relationships between a clothoid curve and various parameters.

In step S13, the processing unit 11 identifies an arc section So in the curved section Sc, based on the road-shape element point data for the road of interest. For example, when a line perpendicular to a midpoint of a straight line that connects adjacent road-shape element points (black dots in FIG. 7) passes through a small area Eo that can be assumed as a single point, as illustrated in FIG. 7, it can be determined that these road-shape element points are located in an arc section So. The processing unit 11 identifies, as an arc section So, the range of a sequence of road-shape element points of which the lines perpendicular to the midpoints pass through the small area Eo. Specifically, the processing unit 11 identifies a sequence of road-shape element points in the arc section So.

After identifying the straight section Ss and the arc section So, as described above, the process proceeds to step S14 in which the processing unit 11 identifies a section between the straight section Ss and the arc section So as a clothoid section Scl. More specifically, a range of a sequence of road-shape element points that lie between the road-shape element point at the edge of the straight section Ss and the road-shape element point at the edge of the arc section So is identified as a clothoid section Scl.

Figure 1:
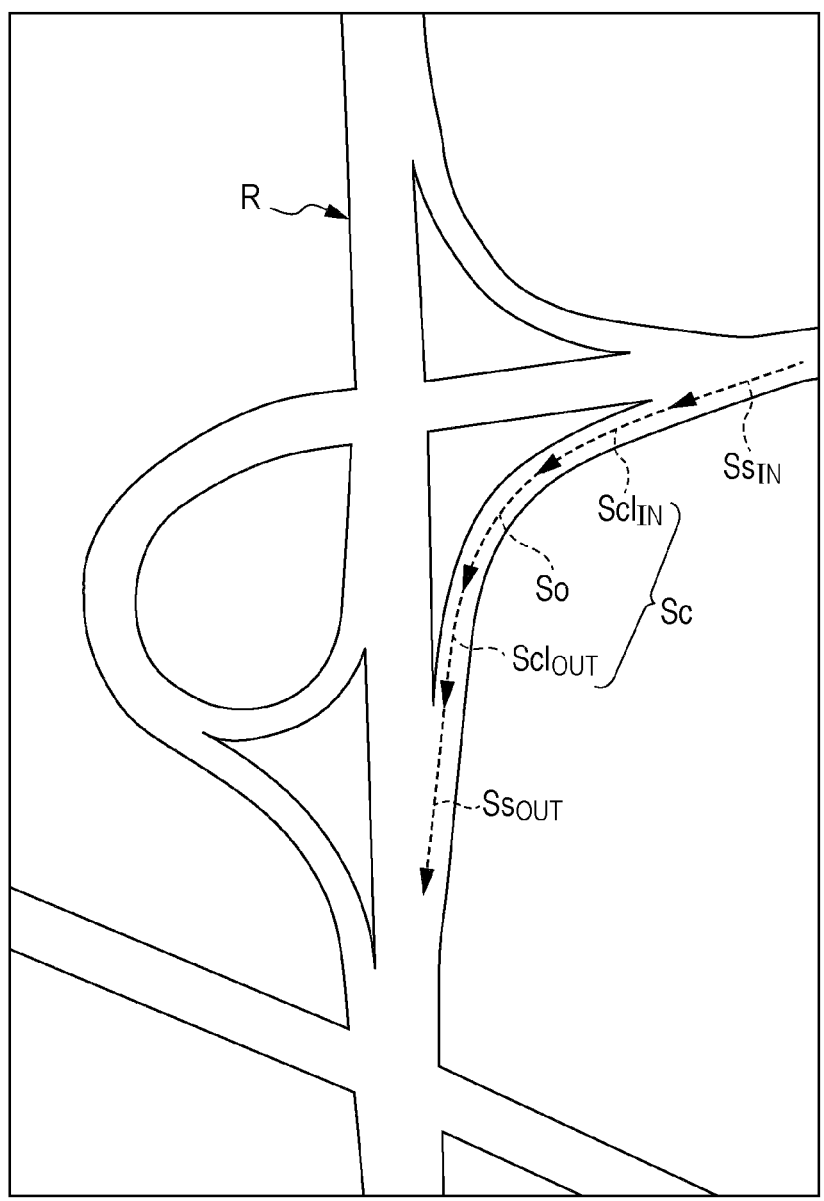
FIG. 1 illustrates one example of an expressway including a curved section.
Figure 2:
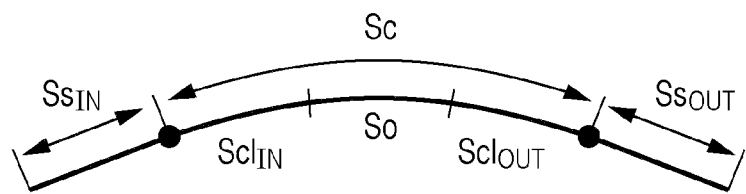
FIG. 2 schematically illustrates the shape of a curved section.
Figure 3:
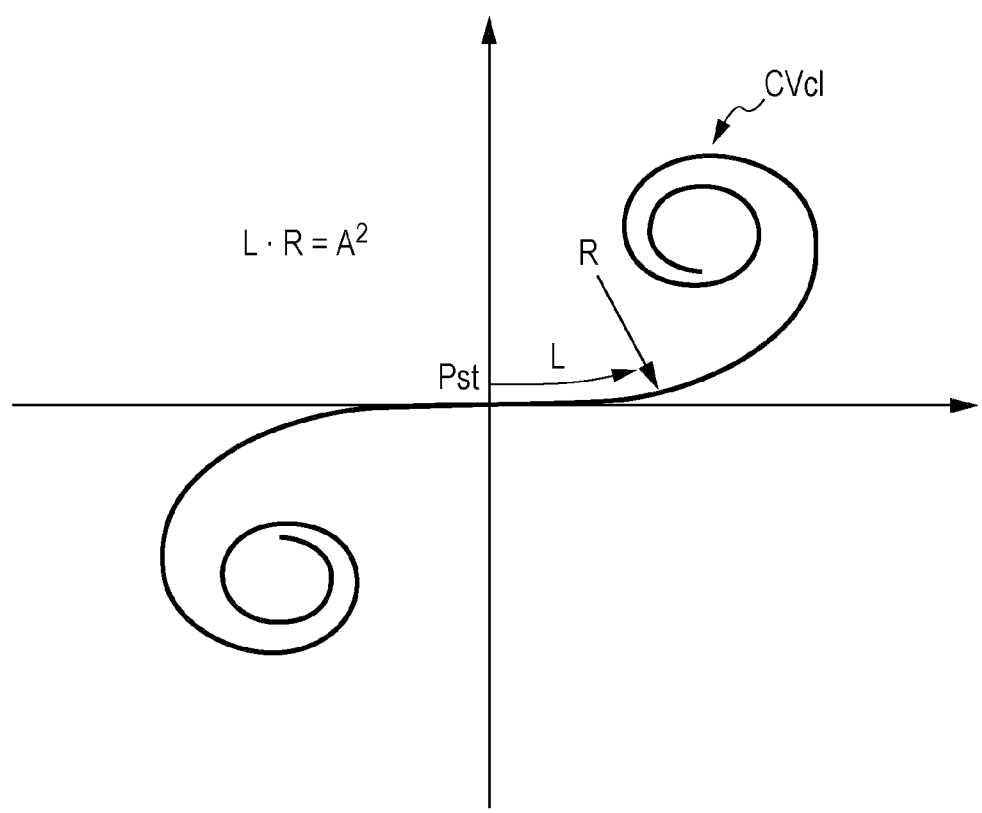
FIG. 3 illustrates a clothoid curve.

In a curved section Sc on a general road, a straight section $Ss_{IN}$, a clothoid section $Scl_{IN}$, and an arc section So are arranged in the direction in which the vehicle enters, and a clothoid section $Scl_{OUT}$ and a straight section $Ss_{OUT}$ are further arranged in the direction in which the vehicle exits the curved section Sc from the arc section So, as illustrated in FIGS. 1 and 2. Thus, in the above-described processes (steps S12 to S14), the clothoid section SclIN at the side where the vehicle enters the curved section Sc is identified as a section between the straight section $Ss_{IN}$ at the side where the vehicle enters and the arc section So, and the clothoid section $Scl_{OUT}$ at the side where the vehicle exits from the curved section Sc is identified as a section between the straight section $Ss_{OUT}$ at the side where the vehicle exits and the arc section So.

Upon identifying the clothoid section Scl in the curved section Sc of the road of interest, as described above, the processing unit 11 specifies a direction (Ss-Scl-So) in which the vehicle enters the curved section Sc (step S15). Thereafter, the processing unit 11 advances to the procedure illustrated in FIG. 6. In step S16, the processing unit 11 performs coordinate conversion on the road-shape element points indicating the road of interest so that the straight section Ss at the side where the vehicle enters the curved section Sc matches an x-axis in an x-y coordinate system and the road-shape element point corresponding to the start point Pst of the clothoid section Scl, the start point Pst being a boundary point between the straight section Ss and the clothoid section Scl that continues therefrom, becomes the origin of the x-y coordinate system, as illustrated in FIG. 7.

In this case, a parameter $\tau$ (=dy/dx) (see FIG. 7) indicates the gradient (an angle relative to the x-axis) of a tangent line to an arc curve representing the shape of the arc section So at a boundary point Pcl-o between the clothoid section Scl and the arc section So in the curved section Sc, and a parameter lc is represented by the curve length Lc from the start point Pst of the clothoid curve CVcl representing the shape of the clothoid section Scl to the boundary point Pcl-o and the clothoid coefficient A for the clothoid curve CVcl and is given by:

$$lc = Lc/A \qquad (1)$$

The relationship between the parameter $\tau$ and the clothoid coefficient A is given by:

$$\tau = \frac{dy}{dx} = \frac{\sin\left(\frac{lc}{\sqrt{2}}\right)^2}{\cos\left(\frac{lc}{\sqrt{2}}\right)^2} \qquad (2)$$

The values of the gradient parameter $\tau$ (=dy/dx) for the values of the parameter lc are determined in accordance with equation (2) noted above, and a table (as illustrated in FIG. 8) indicating relationships between the values of the parameter lc and the values of the parameter $\tau$ is stored in the storage unit 14 in advance.

Referring back to FIG. 6, after performing the coordinate conversion on the road-shape element points for the road of interest, with respect to the post-conversion coordinate system x-y (see FIG. 7), the processing unit 11 calculates, as the value of the gradient parameter $\tau$, an angle made by the x-axis and a tangent line to an arc curve representing the shape of the arc section So at the boundary point Pcl-o between the identified clothoid section Scl and the identified arc section So (step S17). In step S18, by referring to the table (see FIG. 8) stored in the storage unit 14, the processing unit 11 obtains the value of the parameter lc which corresponds to the value of the gradient parameter $\tau$ obtained by the calculation.

Next, in step S19, the processing unit 11 calculates a curve length Lc from the start point Pst of the clothoid curve CVcl representing the shape of the clothoid section Scl to the boundary point Pcl-o between the clothoid section Scl and the arc section So, that is, a curve length Lc of the entire clothoid curve CVcl corresponding to the clothoid section Scl.

Using the obtained value of the parameter lc, the curve length Lc can be calculated according to:

$$Lc = \int_0^{lc} ds \qquad (3)$$

$$ds = \sqrt{(dx)^2 + (dy)^2} \qquad (4)$$
$$= \sqrt{1 + \left(\frac{dy}{dx}\right)^2}\, dx$$

After obtaining the parameter lc from the table (see FIG. 8) (step S18) and obtaining the curve length Lc of the clothoid curve CVcl through the calculation (step S19), as described above, the process proceeds to step S20 in which the processing unit 11 determines a clothoid coefficient A for the clothoid curve CVcl representing the shape of the clothoid section Scl, in accordance with:

$$A = Lc/lc \qquad (5)$$

Equation (5) is derived from equation (1) noted above.

In step S21, the processing unit 11 stores the value of the clothoid coefficient A in the storage unit 14 in association with identification information for identifying the clothoid section Scl in the curved section Sc of the road of interest.

In step S22, the processing unit 11 determines whether or not the processing has already been completed with respect to the direction in which the vehicle exits from the curved section Sc. In step S23, when the processing has not been completed with respect to the exit direction (NO in step S22), the processing unit 11 specifies the direction (So-Scl-Ss) in which the vehicle exits from the curved section Sc. The processing unit 11 performs processes (steps S16 to S21), which are similar to those described above, on a road section that continues from the arc section So in the curved section Sc to the clothoid section Scl and then to the straight section Ss. The value of the clothoid coefficient A associated with the clothoid section Scl at the side where the vehicle exits from the curved section Sc is stored in the storage unit 14. When the processing has been completed with respect to the direction in which the vehicle exits from the curved section Sc (YES in step S22), the processing unit 11 ends the processing for obtaining the clothoid coefficient A.

Figure 9:
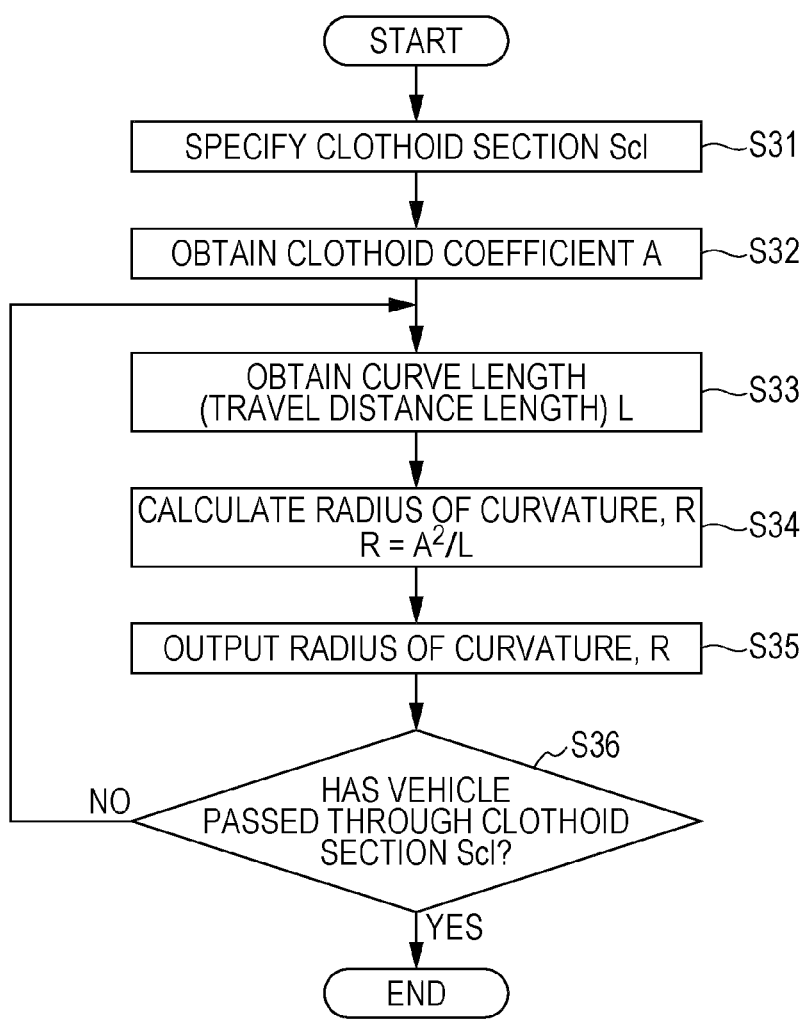
FIG. 9 is a flowchart illustrating processing for calculating a radius of curvature corresponding to each traveling position in a clothoid section.

While the vehicle is traveling, the processing unit 11 generates the radius of curvature, R (curved-section information) at each traveling position in the clothoid section Scl and supplies the generated radius of curvature, R, to the vehicle control device 20 in accordance with the procedure illustrated in FIG. 9.

In step S31 in FIG. 9, when the vehicle is traveling in the curved section Sc, the processing unit 11 specifies the clothoid section Scl included in the curved section Sc. In step S32, the processing unit 11 obtains the clothoid coefficient A stored in the storage unit 14 in association with the clothoid section Scl. In step S33, on the basis of a detection signal from the navigation sensor group 17, the processing unit 11 obtains a travel distance from the start point Pst of the clothoid section Scl as a curve length L from the start point of the clothoid curve CVcl representing the shape of the clothoid section Scl. In step S34, by using the curve length L and the clothoid coefficient A read from the storage unit 14, the processing unit 11 calculates the radius of curvature, R, at the position at the travel distance in the clothoid section Scl which corresponds to the curve length L from the start point of the clothoid curve CVcl, in accordance with:

$$R=A^2/L \qquad (6).$$

In step S35, the processing unit 11 outputs the calculated radius of curvature, R, to the vehicle control device 20 as the curved-section information.

While the vehicle is traveling in the curved section (NO in step S36), the processing unit 11 repeatedly executes the above-described processes (steps S33 to S35) to calculate the radius of curvature, R, at each traveling position from the start point Pst of the clothoid section Scl and output the radius of curvature, R, to the vehicle control device 20 as the curved-section information. When the vehicle has passed through the clothoid section Scl (YES in step S36), the processing unit 11 ends the processing.

When the vehicle is traveling in the arc section So in a curved section, the processing unit 11 outputs a radius of curvature, Rc, of an arc curve representing the shape of the arc section So to the vehicle control device 20 as the curved-section information. The radius of curvature, Rc, of the arc curve may be pre-determined during identification of the arc section So (see step S13 in FIG. 5). While the vehicle passes through the clothoid section Scl at the exit side from the arc section So, the processing unit 11 also calculates the radius of curvature, R, at each traveling position and outputs the radius of curvature, R, to the vehicle control device 20 as the curved-section information, in accordance with the procedure illustrated in FIG. 9.

When the vehicle travels in the curved section Sc, the vehicle control device 20 that receives the radius of curvature, R (curved-section information) takes into account the curved-section information of the radius of curvature, R, together with the vehicle speed at each traveling position, information of a road surface condition, and so on to perform vehicle speed control and aid control for the steering operation and a brake operation so that the vehicle can travel safely in the curved section Sc (the clothoid section Scl).

The curved-section-information supplying apparatus 10 described above identifies a clothoid section Scl and an arc section So in a curved section Sc of a road of interest in accordance with the procedure illustrated in FIG. 5 without actually determining a clothoid curve or an arc curve constituted by a large number of coordinate points. In accordance with the procedure illustrated in FIG. 6, the curved-section-information supplying apparatus 10 obtains, from the table illustrated in FIG. 8, the value of the parameter lc (defined by equation (1)) corresponding to the value of the parameter τ for the gradient of a tangent line to an arc curve representing the shape of the arc section So at the boundary point Pcl-o between the identified clothoid section Scl and the identified arc section So. In addition, the curved-section-information supplying apparatus 10 calculates a curve length Lc, which is the distance from the start point Pst of the clothoid section Scl to the boundary point Pcl-o, by using the value of the parameter lc (see equations (3) and (4)), and calculates a clothoid coefficient A by using the value of the parameter lc and the value of the curve length Lc (see equation (5)). Then, in accordance with the procedure illustrated in FIG. 9 and equation (6) using the clothoid coefficient A, the curved-section-information supplying apparatus 10 calculates the radius of curvature, R, at the position at each travel distance L from the start point Pst of the clothoid section Scl and supplies the radius of curvature, R, to the vehicle control device 20 as the curved-section information. As described above, according to the curved-section-information supplying apparatus 10, the radius of curvature, R, at the position at each travel distance L from the start point Pst of the clothoid section Scl can be supplied to the vehicle control device 20, without actual determination of a clothoid curve represented by a large number of coordinate points. Accordingly, the radius of curvature, R, at each traveling position in the clothoid section Scl included in the curved section Sc of a road can be easily supplied to the vehicle control device 20 as the curved-section information.

Figure 6:
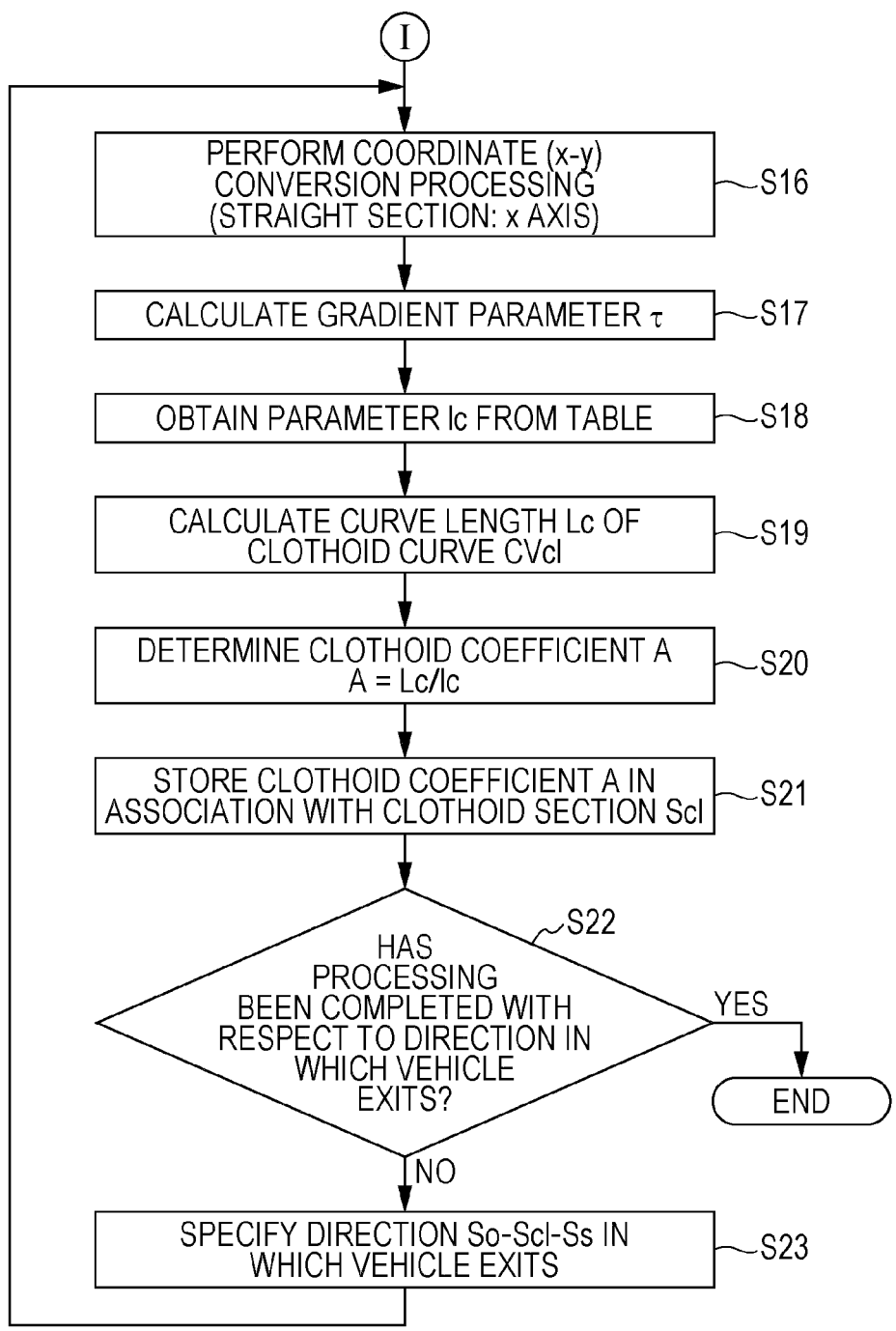
FIG. 6 is a flowchart illustrating processing for obtaining a clothoid coefficient for a clothoid curve representing the shape of an identified clothoid section.
Figure 10:
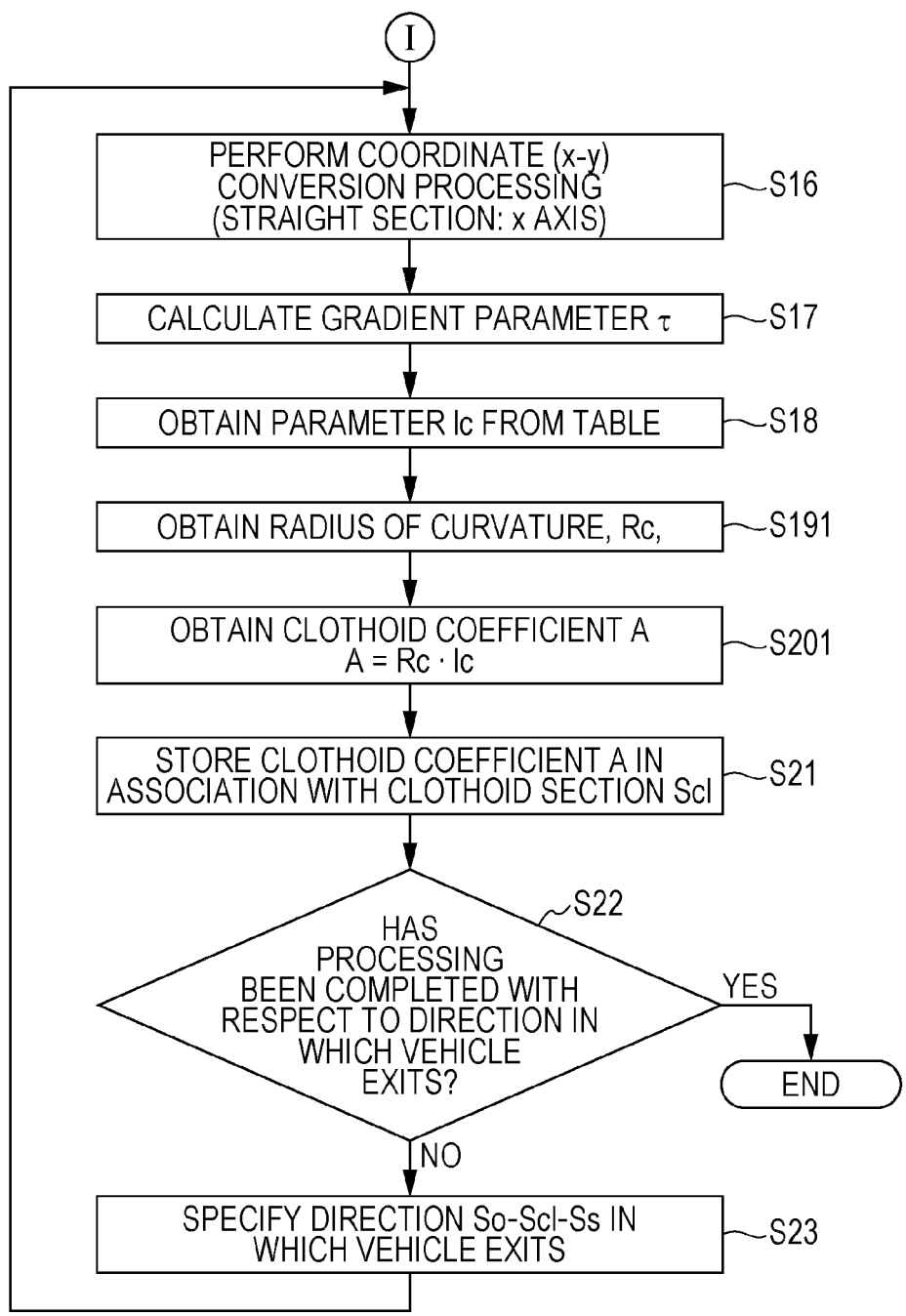
FIG. 10 is a flowchart illustrating processing for obtaining a clothoid coefficient for a clothoid curve representing the shape of an identified clothoid section.

In addition to the procedure illustrated in FIG. 6, the clothoid coefficient A can also be obtained in accordance with the procedure illustrated in FIG. 10. In FIG. 10, steps that are the same as or similar to those illustrated in FIG. 6 are denoted by the same reference characters.

In FIG. 10, in steps S16 to S18, the processing unit 11 obtains the parameter lc defined by equation (1) noted above from the table illustrated in FIG. 8, as in the procedure illustrated in FIG. 6. Next, in step S191, the processing unit 11 obtains the radius of curvature, Rc, of the arc curve representing the shape of the arc section So. For example, the radius of curvature, Rc, of the arc curve may be the average value of the distances between the center of the small area Eo through which the lines perpendicular to the midpoints of the straight lines that connect the adjacent road-shape element points in the arc section So and the road-shape element points, as illustrated in FIG. 7. After the processing unit 11 obtains the radius of curvature, Rc, of the arc curve (the arc section So), the process proceeds to step S201 in which the processing unit 11 determines the clothoid coefficient A by using the value of the parameter lc and the radius of curvature, Rc, of the arc curve and in accordance with:

$$A=Rc \cdot lc \qquad (7), \text{which is derived from}$$

$$Rc \cdot Lc=A^2 \qquad (8), \text{which is obtained by modifying equation (6) noted}$$

above, and equation (1) noted above.

The processing unit 11 stores the clothoid coefficient A, determined as described above, in the storage unit 14 in association with the clothoid section Scl, as in the case of the procedure illustrated in FIG. 6. When the vehicle travels in the curved section Sc, the processing unit 11 calculates the radius of curvature, R, at each traveling position in the clothoid section Scl by using the clothoid coefficient A and supplies the radius of curvature, R, to the vehicle control device 20 as the curved-section information, in accordance with the procedure illustrated in FIG. 9.

When the clothoid coefficient A is obtained in accordance with FIG. 10, it can be obtained by performing calculation using the parameter lc in accordance with equation (7) noted above, instead of calculating, in accordance with equations (3) and (4), the distance Lc from the start point Pst of the clothoid section Scl to the boundary point Pcl-o between the clothoid section Scl and the arc section So. Accordingly, it is possible to further reduce the time taken for the calculation processing, and it is also possible to easily obtain the clothoid coefficient A.

Figure 11:
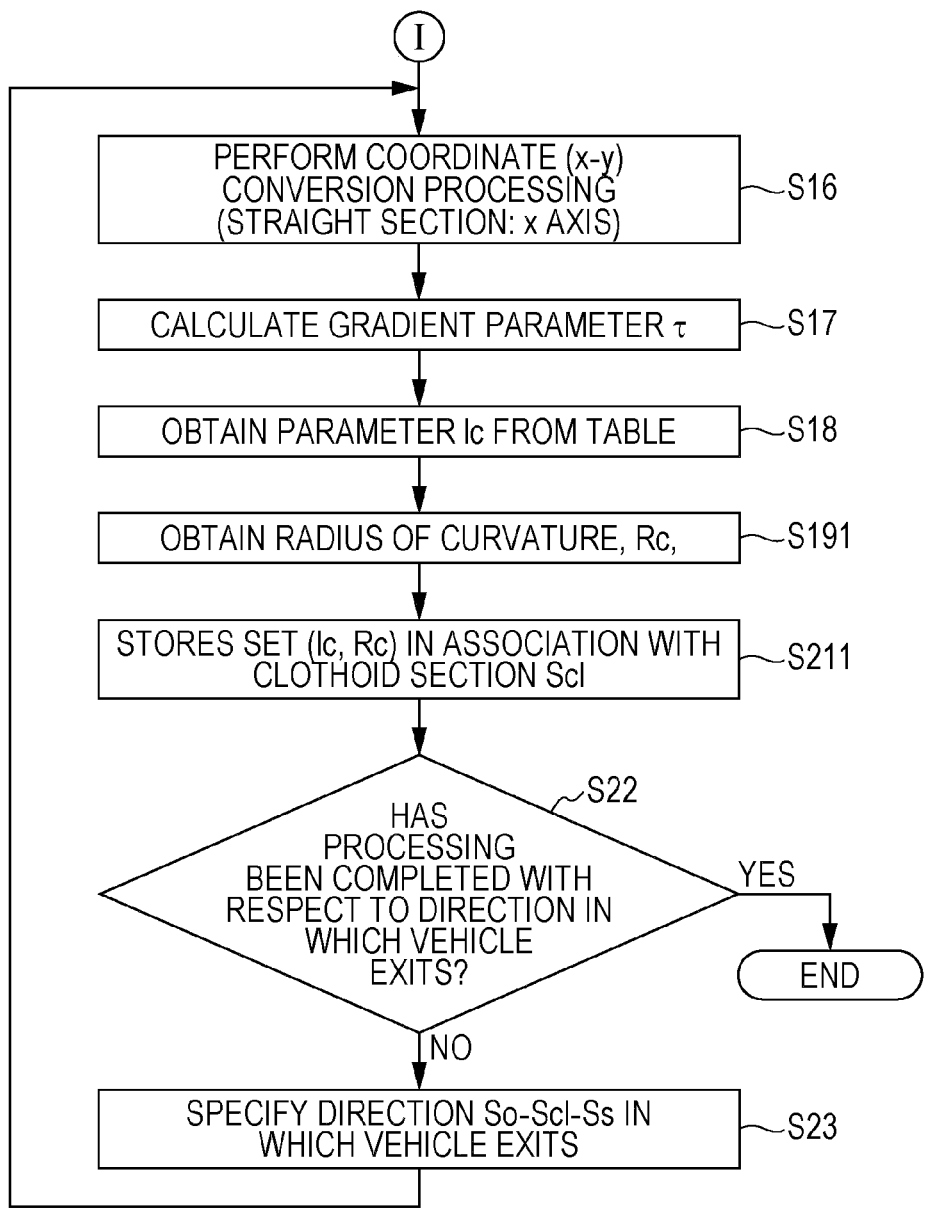
FIG. 11 is a flowchart illustrating processing for obtaining a set of parameters (lc and Rc) for a clothoid curve representing the shape of an identified clothoid section.

It is also possible to obtain the radius of curvature, R, without obtaining the clothoid coefficient A. In such a case, the processing is performed in accordance with a procedure illustrated in FIG. 11, instead of the procedures illustrated in FIGS. 6 and 10. In FIG. 11, steps that are the same as or similar to those illustrated in FIGS. 6 and 10 are denoted by the same reference characters.

In steps S16 to S18 in FIG. 11, the processing unit 11 obtains the parameter lc defined by equation (1) from the table illustrated in FIG. 8, as in the procedure illustrated in FIG. 10. In step S191, the processing unit 11 obtains the radius of curvature, Rc, of an arc curve representing the shape of the arc section So. In step S211, the processing unit 11 stores a set of the value of the parameter lc and the value of the radius of curvature, Rc, of the arc curve in the storage unit 14 in association with the clothoid section Scl. In accordance with the procedure, processing for the clothoid section Scl at the side where the vehicle enters the curved section Sc and the clothoid section Scl at the side where the vehicle exits from the curved section Sc is performed, as in the procedure illustrated in FIGS. 6 and 10.

Figure 12:
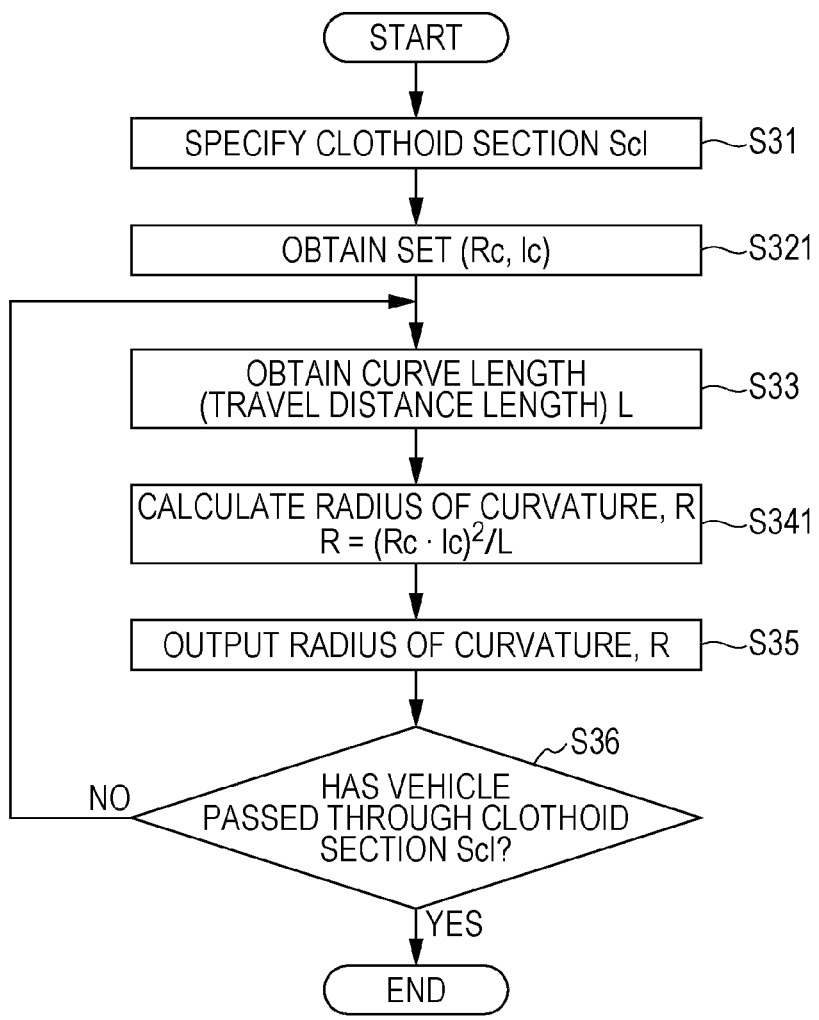
FIG. 12 is a flowchart illustrating processing for calculating a radius of curvature on the basis of the set of parameters (lc and Rc) for the clothoid curve, the set being obtained in accordance with the processing procedure illustrated in FIG. 11.

In a state in which sets of the values of the parameter lc and the radius of curvature, Rc, of arc curve are stored in the storage unit 14 in association with the clothoid section Scl, when the vehicle is traveling in the clothoid section Scl, the processing unit 11 can supply the curved-section information of the radius of curvature, R, at each traveling position in the clothoid section Scl to the vehicle control device 20, in accordance with the procedure illustrated in FIG. 12. In FIG. 12, steps that are the same as or similar to those illustrated in FIG. 9 are denoted by the same reference characters.

In FIG. 12, in step S31, the processing unit 11 specifies a clothoid section Scl. In step S321, the processing unit 11 obtains a set of the value of the radius of curvature, Rc, and the value of the parameter lc, which are stored in the storage unit 14 in association with the specified clothoid section Scl. In step S33, based on a detection signal from the navigation sensor group 17, the processing unit 11 obtains the travel distance from the start point Pst of the clothoid section Scl as the curve length L from the start point of the clothoid curve CVc1 representing the shape of the clothoid section Scl. In step S341, the processing unit 11 calculates the radius of curvature, R, at the position at the travel distance in the clothoid section Scl which corresponds to the curve length L from the start point of the clothoid curve CVc1, in accordance with $$R = (Rc \cdot lc)^2 / L \quad (9)$$

where equation (9) is derived from equations (8) and (1) by using the curve length L, the value of the radius of curvature, Rc, of the arc curve read and obtained from the storage unit 14, and the value of the parameter lc. In step S35, the processing unit 11 outputs the radius of curvature, R, to the vehicle control device 20 as the curved-section information. Thereafter, until the vehicle has passed through the clothoid section Scl (YES in step S36), the processing unit 11 repeatedly executes the process (steps S33, S341, and S35) and supplies the curved-section information of the radius of curvature, R, at each traveling position in the clothoid section Scl to the vehicle control device 20.

As described above, the curved-section-information supplying apparatus 10 calculates the radius of curvature, R, at each traveling position in a clothoid section Scl by using the value of the radius of curvature, Rc, and the value of the parameter lc and supplies the radius of curvature, R, to the vehicle control device 20, in accordance with the above-described procedure illustrated in FIGS. 11 and 12. Since the curved-section-information supplying apparatus 10 does not need to calculate the clothoid coefficient A in accordance with equation (7) when the value of radius of curvature, Rc, and the value of the parameter lc are obtained, it is possible to further reduce the time for the calculation processing.

Although the curved-section-information supplying apparatus 10 described above identifies the straight section Ss and the arc section So in the curved section Sc and identifies the section between the straight section Ss and the arc section So as the clothoid section Scl, the scheme for identifying the clothoid section Scl is not limited thereto. For example, information for identifying the clothoid section Scl may also be included in the map information in association with the road, so that the clothoid section Scl is identified based on the information.

The clothoid coefficient A of a clothoid curve representing the shape of the clothoid section Scl may also be obtained by a scheme other than the above-described calculation scheme. For example, the clothoid coefficient A that has been obtained in road design may also be included in the map information in conjunction with information for identifying the clothoid section, so that the clothoid section is identified and also the clothoid coefficient A is obtained based on the map information.

In addition, although a case in which the curved-section-information supplying apparatus 10 independently executes the processing for obtaining the clothoid coefficient A for the clothoid section Sc or the set of parameters Rc and lc and the processing for supplying the radius of curvature, R, at each traveling position in the clothoid section Sc, they may also be performed as a series of processing while the vehicle travels in the curved section Sc.

The curved-section-information supplying apparatus according to the present invention has an advantage in that it is possible to easily supply curved-section information based on the radius of curvature at each traveling position in a clothoid section included in a curved section of a road, and is useful as a curved-section-information supplying apparatus that supplies curved-section information representing the shape of a clothoid section included in a curved section of a road.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A curved-section-information supplying apparatus that supplies curved-section information regarding a clothoid section included in a curved section of a road, the curved-section-information supplying apparatus comprising:
    a clothoid-section identifying means for identifying a clothoid section included in a curved section of a road;
    a clothoid-coefficient obtaining means for obtaining a clothoid coefficient for a clothoid curve representing a shape of the clothoid section identified by the clothoid-section identifying means; and
    a radius-of-curvature calculating means for calculating a radius of curvature at a position at a travel distance in the clothoid section, based on the clothoid coefficient and a curve length from a start point of the clothoid curve, the curve length corresponding to the travel distance from a start point of the clothoid section, to supply curved-section information based on the radius of curvature at the position at the travel distance in the clothoid section.

2. The curved-section-information supplying apparatus according to claim 1,
wherein the clothoid-section identifying means includes:
a straight-section identifying means for identifying a straight section that connects to the curved section; and
an arc-section identifying means for identifying an arc section in the curved section, to identify a section between the straight section and the arc section as the clothoid section.

3. The curved-section-information supplying apparatus according to claim 2, further comprising:
a storage unit that stores therein a table indicating a relationship between a value of a gradient parameter τ indicating a gradient of a tangent line to an arc curve representing a shape of an arc section at a boundary point between a clothoid section and the arc section in a curved section of a road and a value of a parameter lc defined as $$lc=Lc/A$$

by using a curve length Lc from the start point of the clothoid curve to the boundary point and the clothoid coefficient A,
wherein the clothoid-coefficient obtaining means includes
a gradient obtaining means for obtaining the value of the gradient parameter τ for the tangent line to the arc curve representing the shape of the arc section at the boundary point between the clothoid section identified by the clothoid-section identifying means and the arc section identified by the arc-section identifying means,
a parameter-value obtaining means for obtaining the value of the parameter lc corresponding to the value of the gradient parameter τ obtained by the gradient obtaining means, by referring to the table stored in the storage unit,
a curve-length calculating means for calculating a value of the curve length Lc from the start point of the clothoid curve to the boundary point, and
a clothoid-coefficient calculating means for calculating a value of the clothoid coefficient A, based on the value of the parameter lc and the value of the curve length Lc.

4. The curved-section-information supplying apparatus according to claim 3,
wherein the radius-of-curvature calculating means calculates a radius of curvature, R, at the position at the travel distance in the clothoid section, the travel distance corresponding to a curve length L from the start point of the clothoid curve, in accordance with:

$$R=A^2/L$$

by using the value of the clothoid coefficient A obtained by the clothoid-coefficient obtaining means.

5. The curved-section-information supplying apparatus according to claim 2, further comprising:
a storage unit that stores therein a table indicating a relationship between a value of a gradient parameter τ indicating a gradient of a tangent line to an arc curve representing a shape of an arc section at a boundary point between a clothoid section and the arc section in a curved section of a road and a value of a parameter lc defined as $$lc=Lc/A$$

by using a curve length Lc from the start point of the clothoid curve to the boundary point and the clothoid coefficient A,
wherein the clothoid-coefficient obtaining means includes
a gradient obtaining means for obtaining the value of the gradient parameter τ for the tangent line to the arc curve representing the shape of the arc section at the boundary point between the clothoid section identified by the clothoid-section identifying means and the arc section identified by the arc-section identifying means,
a parameter-value obtaining means for obtaining the value of the parameter lc corresponding to the value of the gradient parameter τ obtained by the gradient obtaining means, by referring to the table stored in the storage unit,
an arc-radius obtaining means for obtaining a value of a radius Rc of an arc curve representing the shape of the arc section identified by the arc-section identifying means, and
a clothoid-coefficient calculating means for calculating the clothoid coefficient A, based on the value of the parameter lc obtained by the parameter-value obtaining means and the value of the radius Rc of the arc curve.

6. The curved-section-information supplying apparatus according to claim 1, further comprising:
a storage unit that stores therein a table indicating a relationship between a value of a gradient parameter τ indicating a gradient of a tangent line to an arc curve representing a shape of an arc section at a boundary point between a clothoid section and the arc section in a curved section of a road and a value of a parameter lc defined as $$lc=Lc/A$$

by using a curve length Lc from the start point of the clothoid curve to the boundary point and the clothoid coefficient A; and
an arc-section identifying means for identifying an arc section that is included in the curved section and connects to the clothoid section,
wherein the clothoid-coefficient obtaining means includes
a gradient obtaining means for obtaining the value of the gradient parameter τ for the tangent line to the arc curve representing the shape of the arc section at the boundary point between the clothoid section identified by the clothoid-section identifying means and the arc section identified by the arc-section identifying means,
a parameter-value obtaining means for obtaining the value of the parameter lc corresponding to the value of the gradient parameter τ obtained by the gradient obtaining means, by referring to the table stored in the storage unit,
a curve-length calculating means for calculating a value of the curve length Lc from the start point of the clothoid curve to the boundary point, and
a clothoid-coefficient calculating means for calculating a value of the clothoid coefficient A, based on the value of the parameter lc and the value of the curve length Lc.

7. The curved-section-information supplying apparatus according to claim 1, further comprising:
a storage unit that stores therein a table indicating a relationship between a value of a gradient parameter τ indicating a gradient of a tangent line to an arc curve representing a shape of an arc section at a boundary point between a clothoid section and the arc section in a curved section of a road and a value of a parameter lc defined as $$lc=Lc/A$$

by using a curve length Lc from the start point of the clothoid curve to the boundary point and the clothoid coefficient A; and an arc-section identifying means for identifying an arc section that is included in the curved section and connects to the clothoid section, wherein the clothoid-coefficient obtaining means includes a gradient obtaining means for obtaining the value of the gradient parameter τ for the tangent line to the arc curve representing the shape of the arc section at the boundary point between the clothoid section identified by the clothoid-section identifying means and the arc section identified by the arc-section identifying means, a parameter-value obtaining means for obtaining the value of the parameter lc corresponding to the value of the gradient parameter τ obtained by the gradient obtaining means, by referring to the table stored in the storage unit, an arc-radius obtaining means for obtaining a value of a radius Rc of an arc curve representing the shape of the arc section identified by the arc-section identifying means, and a clothoid-coefficient calculating means for calculating the clothoid coefficient A, based on the value of the parameter lc obtained by the parameter-value obtaining means and the value of the radius Rc of the arc curve.

8. The curved-section-information supplying apparatus according to claim 7, wherein the clothoid-coefficient calculating means calculates the clothoid coefficient A in accordance with:

$A = Rc \cdot lc$, which is derived from $Rc \cdot Lc = A^2$, and $lc = Lc/A$.

9. The curved-section-information supplying apparatus according to claim 7, wherein the radius-of-curvature calculating means calculates a radius of curvature, R, in accordance with $R = A^2/L$ using a curve length L from the start point of the clothoid curve, the curve length L corresponding to a travel distance from the start point of the clothoid section.

10. A curved-section-information supplying apparatus that supplies curved-section information regarding a clothoid section included in a curved section of a road, the curved-section-information supplying apparatus comprising:

a clothoid-section identifying means for identifying a clothoid section included in a curved section of a road;

an arc-section identifying means for identifying an arc section that follows the clothoid section;

a storage unit that stores therein a table indicating a relationship between a value of a gradient parameter τ indicating a gradient of a tangent line to an arc curve representing a shape of an arc section at a boundary point between a clothoid section and the arc section in a curved section of a road and a value of a parameter lc defined as $lc = Lc/A$ by using a curve length Lc from a start point of the clothoid curve to the boundary point and a clothoid coefficient A;

an arc-radius obtaining means for obtaining a value of a radius Rc of an arc curve representing the shape of the arc section identified by the arc-section identifying means;

a gradient obtaining means for obtaining the value of the gradient parameter τ for the tangent line to the arc curve representing the shape of the arc section at the boundary point between the clothoid section identified by the clothoid-section identifying means and the arc section identified by the arc-section identifying means;

a parameter-value obtaining means for obtaining the value of the parameter lc corresponding to the value of the gradient parameter τ obtained by the gradient obtaining means, by referring to the table stored in the storage unit; and a radius-of-curvature calculating means for calculating a radius of curvature at a position at a travel distance in the clothoid section, based on a curve length L from the start point of the clothoid curve, the curve length L corresponding to the travel distance from a start point of the clothoid section, the value of the parameter lc obtained by the parameter-value obtaining means, and the value of the radius Rc of the arc curve obtained by the arc-radius obtaining means, to supply curved-section information based on the radius of curvature at the position at the travel distance in the clothoid section.

11. The curved-section-information supplying apparatus according to claim 10, wherein the clothoid-section identifying means includes straight-section identifying means for identifying a straight section that connects to the curved section, and identifies, as the clothoid section, a section between the straight section the arc section identified by the arc-section identifying means.

12. The curved-section-information supplying apparatus according to claim 11, wherein the radius-of-curvature calculating means calculates the radius of curvature, R, in accordance with $R = (Rc \cdot lc)^2/L$, which is derived from $R \cdot L = A^2$ and $lc = Lc/A$, where $R \cdot L = A^2$ uses the curve length L from the start point of the clothoid curve, the curve length L corresponding to a travel distance from a start point of the clothoid section, and the clothoid coefficient A of the clothoid curve.

13. A curved-section-information supplying method for supplying curved-section information regarding a clothoid section included in a curved section of a road, the curved-section-information supplying method comprising:

a clothoid-section identifying step of identifying a clothoid section included in a curved section of a road;

a clothoid-coefficient obtaining step of obtaining a clothoid coefficient for a clothoid curve representing a shape of the clothoid section identified in the clothoid-section identifying step; and a radius-of-curvature calculating step of calculating a radius of curvature at a position at a travel distance in the clothoid section, based on the clothoid coefficient and a curve length from a start point of the clothoid curve, the curve length corresponding to the travel distance from a start point of the clothoid section, to supply curved-section information based on the radius of curvature at the position at the travel distance in the clothoid section.

14. The curved-section-information supplying method according to claim 13,
   wherein the clothoid-section identifying step includes:
      a straight-section identifying step for identifying a straight section that connects to the curved section; and
      an arc-section identifying step for identifying an arc section in the curved section,
   to identify a section between the straight section and the arc section as the clothoid section.

15. The curved-section-information supplying method according to claim 14, further comprising:
   storing in a storage unit a table indicating a relationship between a value of a gradient parameter τ indicating a gradient of a tangent line to an arc curve representing a shape of an arc section at a boundary point between a clothoid section and the arc section in a curved section of a road and a value of a parameter lc defined as $$lc = Lc/A$$

by using a curve length Lc from the start point of the clothoid curve to the boundary point and the clothoid coefficient A,
   wherein the clothoid-coefficient obtaining step includes
      a gradient obtaining step for obtaining the value of the gradient parameter τ for the tangent line to the arc curve representing the shape of the arc section at the boundary point between the clothoid section identified by the clothoid-section identifying step and the arc section identified by the arc-section identifying step,
      a parameter-value obtaining step for obtaining the value of the parameter lc corresponding to the value of the gradient parameter τ obtained by the gradient obtaining step, by referring to the table stored in the storage unit,
      a curve-length calculating step for calculating a value of the curve length Lc from the start point of the clothoid curve to the boundary point, and
      a clothoid-coefficient calculating step for calculating a value of the clothoid coefficient A, based on the value of the parameter lc and the value of the curve length Lc.

16. The curved-section-information supplying method according to claim 15,
   wherein the radius-of-curvature calculating step calculates a radius of curvature, R, at the position at the travel distance in the clothoid section, the travel distance corresponding to a curve length L from the start point of the clothoid curve, in accordance with:

$$R = A^2/L$$

by using the value of the clothoid coefficient A obtained by the clothoid-coefficient obtaining step.

17. The curved-section-information supplying method according to claim 14, further comprising:
   storing in a storage unit a table indicating a relationship between a value of a gradient parameter τ indicating a gradient of a tangent line to an arc curve representing a shape of an arc section at a boundary point between a clothoid section and the arc section in a curved section of a road and a value of a parameter lc defined as $$lc = Lc/A$$

by using a curve length Lc from the start point of the clothoid curve to the boundary point and the clothoid coefficient A,
   wherein the clothoid-coefficient obtaining step includes
      a gradient obtaining step for obtaining the value of the gradient parameter τ for the tangent line to the arc curve representing the shape of the arc section at the boundary point between the clothoid section identified by the clothoid-section identifying step and the arc section identified by the arc-section identifying step,
      a parameter-value obtaining step for obtaining the value of the parameter lc corresponding to the value of the gradient parameter τ obtained by the gradient obtaining step, by referring to the table stored in the storage unit,
      an arc-radius obtaining step for obtaining a value of a radius Rc of an arc curve representing the shape of the arc section identified by the arc-section identifying step, and
      a clothoid-coefficient calculating step for calculating the clothoid coefficient A, based on the value of the parameter lc obtained by the parameter-value obtaining step and the value of the radius Rc of the arc curve.

18. The curved-section-information supplying method according to claim 13, further comprising:
   storing in a storage unit a table indicating a relationship between a value of a gradient parameter τ indicating a gradient of a tangent line to an arc curve representing a shape of an arc section at a boundary point between a clothoid section and the arc section in a curved section of a road and a value of a parameter lc defined as $$lc = Lc/A$$

by using a curve length Lc from the start point of the clothoid curve to the boundary point and the clothoid coefficient A; and
      an arc-section identifying step for identifying an arc section that is included in the curved section and connects to the clothoid section,
   wherein the clothoid-coefficient obtaining step includes
      a gradient obtaining step for obtaining the value of the gradient parameter τ for the tangent line to the arc curve representing the shape of the arc section at the boundary point between the clothoid section identified by the clothoid-section identifying step and the arc section identified by the arc-section identifying step,
      a parameter-value obtaining step for obtaining the value of the parameter lc corresponding to the value of the gradient parameter τ obtained by the gradient obtaining step, by referring to the table stored in the storage unit,
      a curve-length calculating step for calculating a value of the curve length Lc from the start point of the clothoid curve to the boundary point, and
      a clothoid-coefficient calculating step for calculating a value of the clothoid coefficient A, based on the value of the parameter lc and the value of the curve length Lc.

19. The curved-section-information supplying method according to claim 13, further comprising:
   storing in a storage unit a table indicating a relationship between a value of a gradient parameter τ indicating a gradient of a tangent line to an arc curve representing a shape of an arc section at a boundary point between a clothoid section and the arc section in a curved section of a road and a value of a parameter lc defined as $$lc = Lc/A$$

by using a curve length Lc from the start point of the clothoid curve to the boundary point and the clothoid coefficient A; and an arc-section identifying step for identifying an arc section that is included in the curved section and connects to the clothoid section, wherein the clothoid-coefficient obtaining step includes a gradient obtaining step for obtaining the value of the gradient parameter τ for the tangent line to the arc curve representing the shape of the arc section at the boundary point between the clothoid section identified by the clothoid-section identifying step and the arc section identified by the arc-section identifying step, a parameter-value obtaining step for obtaining the value of the parameter lc corresponding to the value of the gradient parameter τ obtained by the gradient obtaining step, by referring to the table stored in the storage unit, an arc-radius obtaining step for obtaining a value of a radius Rc of an arc curve representing the shape of the arc section identified by the arc-section identifying step, and a clothoid-coefficient calculating step for calculating the clothoid coefficient A, based on the value of the parameter lc obtained by the parameter-value obtaining step and the value of the radius Rc of the arc curve.

20. The curved-section-information supplying method according to claim 19, wherein the clothoid-coefficient calculating step calculates the clothoid coefficient A in accordance with:

A=Rc·lc, which is derived from $Rc \cdot Lc = A^2$, and $lc = Lc/A$.

* * * * *